US012584894B2

(12) United States Patent  
He et al.

(10) Patent No.: US 12,584,894 B2  
(45) Date of Patent: Mar. 24, 2026

(54) GAS CHROMATOGRAPHY SYSTEM

(71) Applicant: Agilent Technologies, Inc., Santa Clara, CA (US)

(72) Inventors: Ming-Hao He, Shanghai (CN); Wan Li, Shanghai (CN); Li Xu, Shanghai (CN); Ting-Ting Bu, Shanghai (CN); Qian Tao, Shanghai (CN)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 310 days.

(21) Appl. No.: 18/561,656

(22) PCT Filed: Apr. 6, 2022

(86) PCT No.: PCT/US2022/023704  
§ 371 (c)(1),  
(2) Date: Nov. 16, 2023

(87) PCT Pub. No.: WO2022/245440  
PCT Pub. Date: Nov. 24, 2022

(65) Prior Publication Data  
US 2024/0241088 A1 Jul. 18, 2024

Related U.S. Application Data

(60) Provisional application No. 63/189,525, filed on May 17, 2021.

(51) Int. Cl.  
*G01N 30/46* (2006.01)  
*B01D 53/02* (2006.01)

(52) U.S. Cl.  
CPC ......... *G01N 30/468* (2013.01); *B01D 53/025* (2013.01); *G01N 30/461* (2013.01); *G01N 30/466* (2013.01)

(58) Field of Classification Search  
CPC ..... G01N 30/46–468; G01N 2030/025; B01D 53/02; B01D 53/025  
See application file for complete search history.

(56) References Cited

U.S. PATENT DOCUMENTS

| | | | | |
|---|---|---|---|---|
| 4,234,315 A | * | 11/1980 | Scott ...................... | G01N 31/12 436/115 |
| 8,562,837 B2 | * | 10/2013 | Tipler ................... | G01N 30/40 95/82 |
| 2004/0182134 A1 | * | 9/2004 | Staphanos ............ | G01N 33/225 73/23.35 |

FOREIGN PATENT DOCUMENTS

| | | |
|---|---|---|
| CN | 102628846 A | 8/2012 |
| CN | 104931615 A | 9/2015 |
| CN | 104678034 B | 12/2017 |
| CN | 111380988 A | 7/2020 |
| CN | 111948327 A | 11/2020 |
| JP | 2012-150032 A | 8/2012 |
| KR | 20170041101 A | 4/2017 |

OTHER PUBLICATIONS

EPO, "Extended European Search Report mailed on Mar. 12, 2025", Application No. 22805135.5, 19 pages.

(Continued)

*Primary Examiner* — Justin N Olamit  
(74) *Attorney, Agent, or Firm* — Lando & Anastasi, LLP

(57) ABSTRACT

The present disclosure relates generally to gas chromatography systems with ultra-high detection capability.

32 Claims, 11 Drawing Sheets

(56) References Cited

OTHER PUBLICATIONS

PCT, "Notification of Transmittal of The International Search Report & Written Opinion mailed on Jul. 22, 2022," Application No. PCT/US2022/023704, 14 pages.

Yao Weijun, Trace analysis of impurities in bulk gases by gas chromatography-pulsed discharge helium ionization detection with "heart-cutting" technique, Journal of Chromatography A, Sep. 4, 2007, 225-230.

* cited by examiner

GAS CHROMATOGRAPHY SYSTEM

CROSS-REFERENCE TO RELATED APPLICATIONS

This application is a US national stage entry of PCT/US2022/23704, filed Apr. 6, 2022, which claims priority to and benefit of U.S. Patent Application No. 63/189,525, filed on May 17, 2021, the contents of which are incorporated herein by reference in its entirety.

FIELD OF THE INVENTION

The present disclosure relates generally to gas chromatography systems with ultra-high detection capability.

BACKGROUND OF THE INVENTION

Gas chromatographs (GC) can analyze samples (including samples that exist in a gas phase or samples that can be vaporized) by separating analytes within the sample and producing a signal that indicates the relative amount and/or identity of the analytes. A known and/or repeatable volume of sample is injected or inserted into the flowpath and the sample is carried through one or more GC columns, which are typically heated and which contain a stationary phase that separates the analytes. Separated analytes exit to a detector which produces a signal indicative of the relative amount and/or identity of analyte in the sample. A carrier gas moves the sample through the GC flowpath. Typical carrier gases used in gas chromatography include helium, hydrogen, nitrogen, and a mixture of argon and methane.

Some gas samples require chromatographic separations from multiple columns in order to achieve sufficient separation of the analytes for analysis. Gas chromatography systems are available which employ multi-dimensional chromatographic separation schemes, with 2, 3 or more chromatographic separation columns. The gas flowpath connection between the multi-dimensional chromatographic columns can be directed by various switching valves and conduit schemes.

SUMMARY OF THE INVENTION

As an aspect of the invention, gas chromatography systems are provided. As another aspect, novel methods of separating various analytes, including analyte portions comprising one or more of Ar, $O_2$, $N_2$, $CH_4$, and CO, from a gas matrix and from $CO_2$ are provided.

These and other features and advantages of the present devices and methods will be apparent from the following detailed description, in conjunction with the appended claims.

Figure 1A:
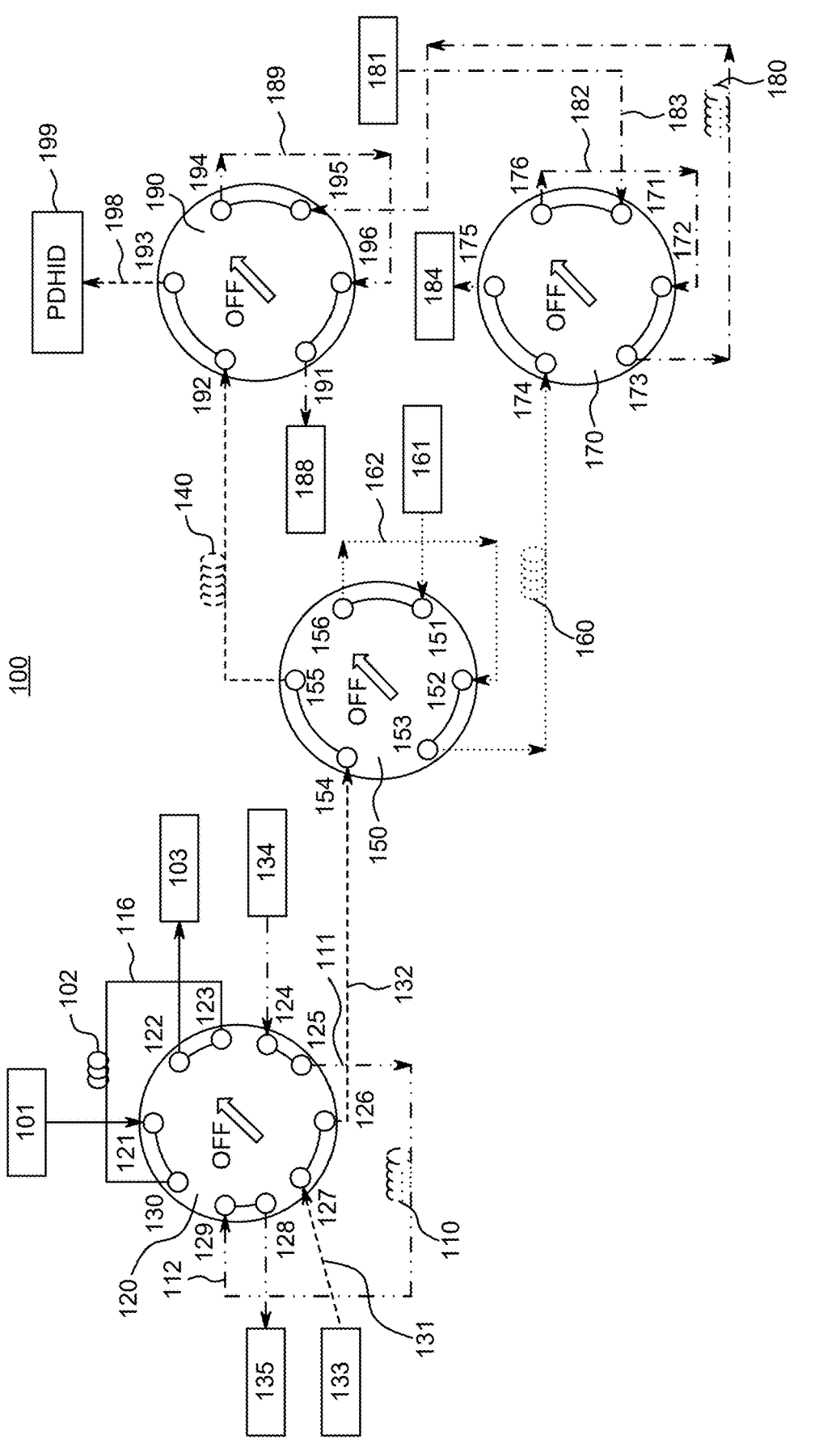
FIGS. 1A to 1J show an embodiment of the present gas chromatography system at various times of operation.

In the accompanying drawings, various patterns of dotted and dashed lines are generally used to illustrate various flowpaths available within an apparatus. It should be recognized that dotted and dashed lines do not necessarily represent a different structure compared to solid lines.

The features in the drawings are not necessarily drawn to scale. The present teachings are best understood from the following detailed description when read with the accompanying drawings.

DETAILED DESCRIPTION

The present disclosure provides a GC system for analyzing various high-purity gases such as high-purity hydrogen gas, with detection capability of impurities of less than 10 parts-per-billion (ppb), high control precision and system stability. Some of the problems solved or mitigated by the present technology include: Risk of contamination and peak widening due to isolation valves; Limited applications to certain types of gas samples; Risks to system stability and precision caused by manual adjustment; Inconvenience in GC column maintenance; Peak widening by requiring certain analytes to flow through columns which do not contribute to their separation; Interference of pure gas matrix with peaks of analytes. Among the advantages of some embodiments of the present technology are: Valve system with no isolation valve to reduce risk of contamination and peak widening; Versatile analytical capability in one GC system for various types of gas samples; High precision pneumatic control to ensure GC system precision and stability; Less time required for maintenance and for purging after maintenance; Column switching (or heart-cutting) to send analytes into columns most appropriate for their separation; Venting of pure gas matrix to reduce interference with analyte peaks.

In view of this disclosure, it is noted that the systems and methods can be implemented in keeping with the present teachings. Further, the various components, materials, structures, steps and parameters are included by way of illustration and example only and not in any limiting sense. In view of this disclosure, the present teachings can be implemented in other applications and components, structures, steps and equipment to implement these applications can be determined, while remaining within the scope of the appended claims.

FIGS. 1A to 1J show an embodiment of the present gas chromatography system 100. As described in more detail below, the GC system comprises a GC system entrance 101; a first column 110 fluidically connected to the GC system entrance through a first valve 120; a second column 140 fluidically connected to the first column 110 through a second valve 150; a third column 160 fluidically connected to the first column 110 through the second valve 150; a fourth column 180 fluidically connected to the third column 160 through a third valve 170; and a GC system exit 198 fluidically connected to both the fourth column 180 and the second column 140 through a fourth valve 190. The first column 110 is capable of separating one or more of Ar, $O_2$, $N_2$, $CH_4$, and CO, from a gas matrix such as $H_2$ and from $CO_2$. Note that the column separation of the gas matrix from the analytes may include partially separating the gas matrix from the analytes. Some gas matrix may still elute at the same time as the analytes, however it will be far less than if the columns had not separated the portion gas matrix from the analytes. The second column 140 is capable of separating $H_2$ (or other gas matrix) from $CO_2$. The third column 160 is capable of separating one or more analytes selected from the group consisting of Ar, $O_2$, $N_2$, $CH_4$, and CO from the gas matrix and from another analyte of said one or more analytes. In some embodiments, the third column is capable of separating each of said one or more analytes selected from Ar, $O_2$, $N_2$, $CH_4$, and CO from each of the other selected analytes. The fourth column 180 is capable of further separating one or more of Ar, $O_2$, $N_2$, $CH_4$, and CO from the gas matrix. In some embodiments, one or more analytes (such as Ar, $O_2$, $N_2$, $CH_4$, and/or CO) separated in the fourth column are substantially free of gas matrix. In this context, an analyte is substantially free of gas matrix when the amount of matrix does not substantially interfere with detection or quantification of the analyte. The foregoing columns may be capable of other separations; in other words the separation capabilities are not limited to the recited components. For example, the first column 110 may also be capable of separating heavier alkanes from one or more of $H_2$, $CH_4$, and $CO_2$.

The first valve 120, second valve 150, third valve 170 and fourth valve 190 can be any suitable type or design. As illustrated in FIGS. 1A-1J, the first valve 120 is a ten-port valve having ports 121, 122, 123, 124, 125, 126, 127, 128, 129, 130. Port 121 is configured as a first valve inlet, as it is fluidically connected to a GC system entrance 101. Port 122 is a valve outlet fluidically connected to a sample outlet 103. Ports 123 and 130 are connected to loop ends of a sample loop 102; Ports 124 and 127 are connected to carrier gas sources 134, 133; Ports 125 and 129 are connected to column ends of a first column 110; Port 126 is connected to a conduit 132 to a second valve 150; and Port 128 is connected to a vent 135. The second valve 150 is a six-port valve having ports 151, 152, 153, 154, 155, 156. Port 151 is connected to a carrier gas supply 161; Ports 152 and 156 are connected to ends of a conduit 162; Port 153 is connected to the entrance of an third column 160; Port 154 is connected to a conduit 132 from the first valve 120; and Port 155 is connected to the entrance of a second column 140. The third valve 170 is a six-port valve having ports 171, 172, 173, 174, 175, 176. Port 171 is connected to a carrier gas source 181 via conduit 183; Ports 172 and 176 are connected to ends of a conduit 182; Port 173 is connected to the entrance of a fourth column 180; Port 174 is connected to the outlet of the third column 160; and Port 175 is connected to a vent 184. The fourth valve 190 is a six-port valve having ports 191, 192, 193, 194, 195, 196. In some embodiments, the fourth valve is a 6-port valve having parts 1 to 6 numbered clockwise (as illustrated by parts 191 to 196 in FIGS. 1A-1J) and the ports are connected to particular elements as follows: Port 191 is connected to a vent 188; Port 192 is connected to the outlet of the second column 140; Port 193 is connected to a GC system exit 198, which leads to a detector 199; Ports 194 and 196 are connected to a conduit 189; and Port 195 is connected to the outlet of the fourth column 180.

In the exemplary operation of the GC system 100 described below, the sample is a high-purity hydrogen ($H_2$) sample with contaminants such as air and carbon monoxide (Air+CO), lighter alkanes ($CH_4$), carbon dioxide ($CO_2$), and heavier alkanes (C2+) such as ethane or propane. The GC system is used to analyze the high-purity hydrogen gas for some or all of those contaminants, which are identified as analytes by the detector. Thus the present GC system can detect low amounts of contaminants in a gas matrix such as hydrogen gas or other high-purity gas. Of course, one will recognize that the present GC system can be used for other types of gas samples, such as helium, argon, oxygen, nitrogen, methane, carbon dioxide, and neon gases. Different types of high-purity gases (e.g., high-purity $H_2$, He, Ar, $O_2$, $N_2$, $CH_4$, $CO_2$, or Ne) may have different types of contaminants. There need not be hardware modifications to the present GC system, only GC method modifications will be needed when changing the type of gas matrix. The sample sources can be provided from tanks of compressed gas or from other vessels, (e.g. gas streams or sample vials). Flow of the gas through the columns may be controlled in constant pressure or constant flow mode. FIG. 1A illustrates operation at Step 1, with the system in a state to fill the sample loop with a sample. In many gas chromatographs, sample loops are filled with a gas sample, then fluidic connections are switched to load the gas sample from the sample loop into a GC column.

In FIG. 1A, all of the valves 120, 150, 170, 190 are in their OFF positions. The sample is loaded into the sample loop 102 by allowing the pressurized gas sample to flow through the sample loop 102 until the volume of the sample loop 102 is filled with sample. The first valve 120 comprises a plurality of valve inlets (for example, valve inlets 121, 124, 127) and at least one valve outlet 126. In FIG. 1A, a sample enters through GC sample entrance 101 and passes through port 130 to sample loop 102. In the OFF position, the first valve 120 provides a flowpath to sample outlet 103. The sample loop 102 is optional and may be outside the GC system 100, as in some embodiments, sample entrances are directly connected to column 110. FIGS. 1A-1J also show carrier gas conduit 131, first valve exit conduit 132, and Carrier gas source 133.

Figure 1B:
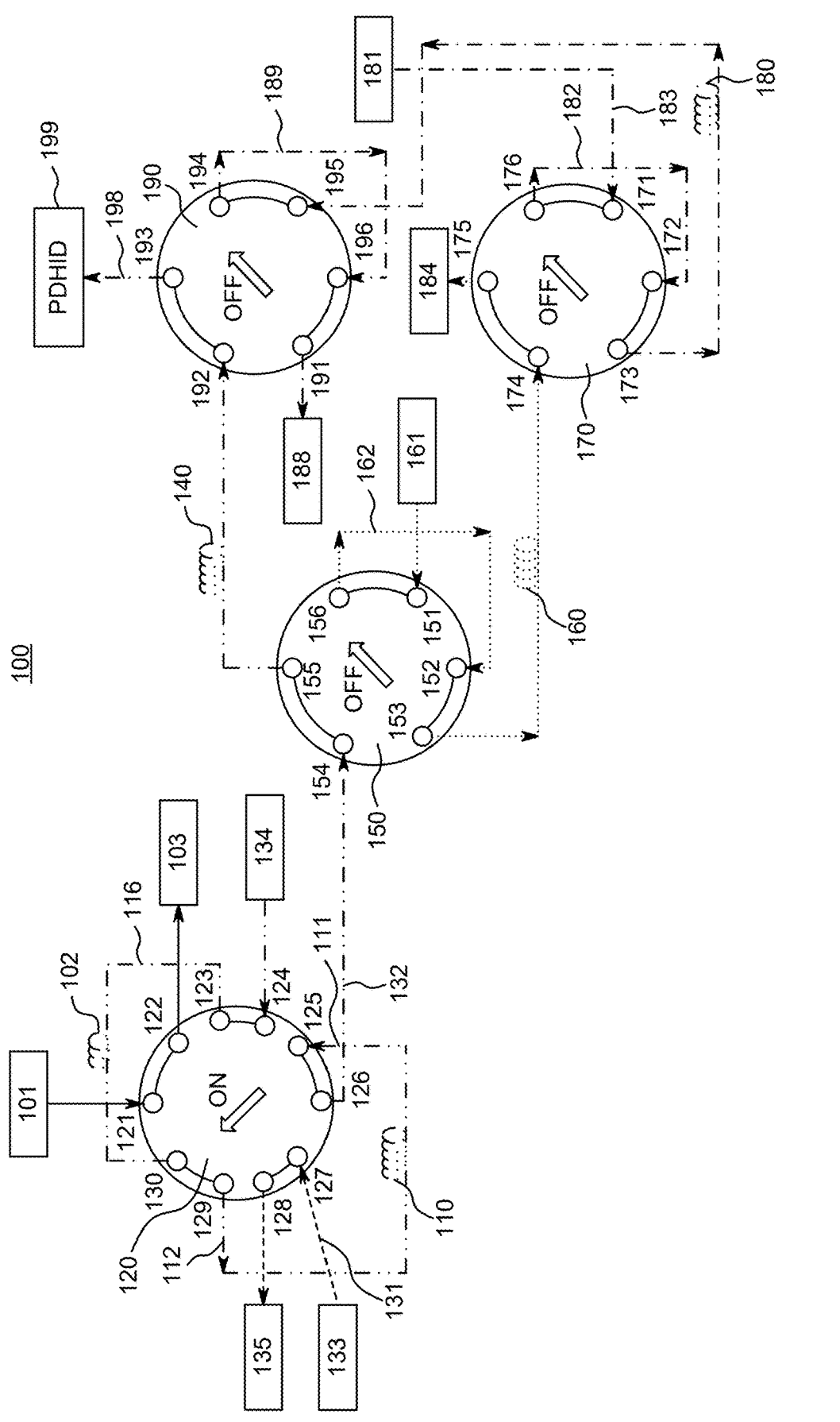

FIG. 1B illustrates operation of the gas chromatography system at Step 2, when one desires to inject the sample to a first column 110. After the sample loop is filled, the first valve 120 is switched to its ON position to place the sample loop in line with the GC column flowpath, and carrier gas from carrier gas source 134 pushes the sample contained in the sample loop onto the GC column 110 for analysis. Components of the sample elute from column 110 in the following order: $H_2$, Air+CO, $CH_4$, $CO_2$, and C2+. Because the concentration of $H_2$ is so high, since it is the gas matrix, it will tail for a relatively long time which will impact other components analysis by causing the baseline signal to rise. The present GC system reduces or eliminates the matrix effect by purging, heat-cutting, column selection, among other steps and features.

Figure 1C:
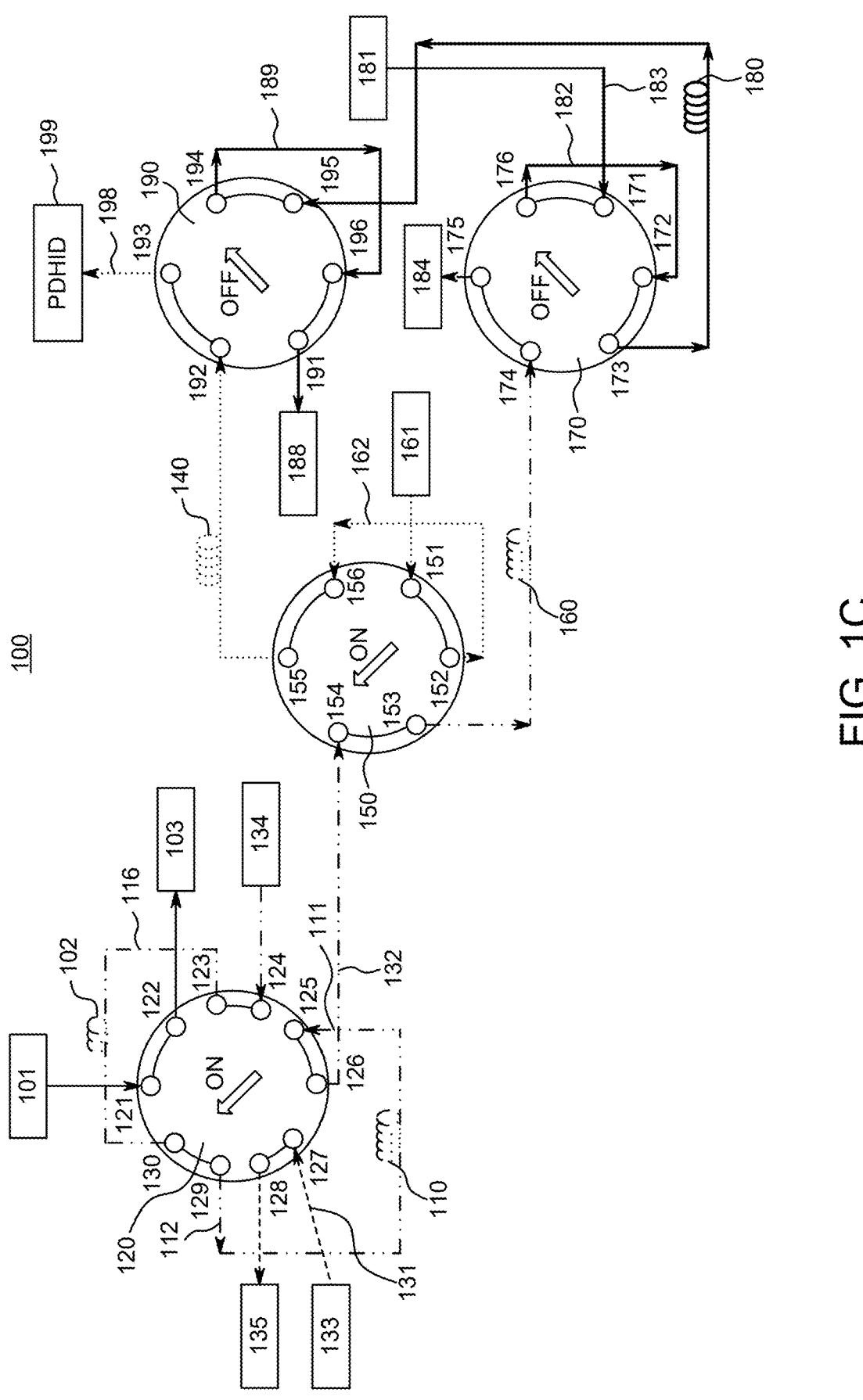

FIG. 1C illustrates operation at Step 3, when one desires to pass $H_2$, $N_2$, Ar, CO, and $CH_4$ to an third column 160. The first and second valves 120, 150 are at their ON positions, and the third and fourth valves 170, 190 remain in their OFF positions. Analytes continue eluting from column 110 in the following order: $H_2$, Air+CO, $CH_4$, $CO_2$, C2+. Before $CO_2$ elutes out from first column 110, the second valve 150 is switched to its ON position to send $H_2$, Air+CO, and $CH_4$ into the third column 160.

Figure 1D:
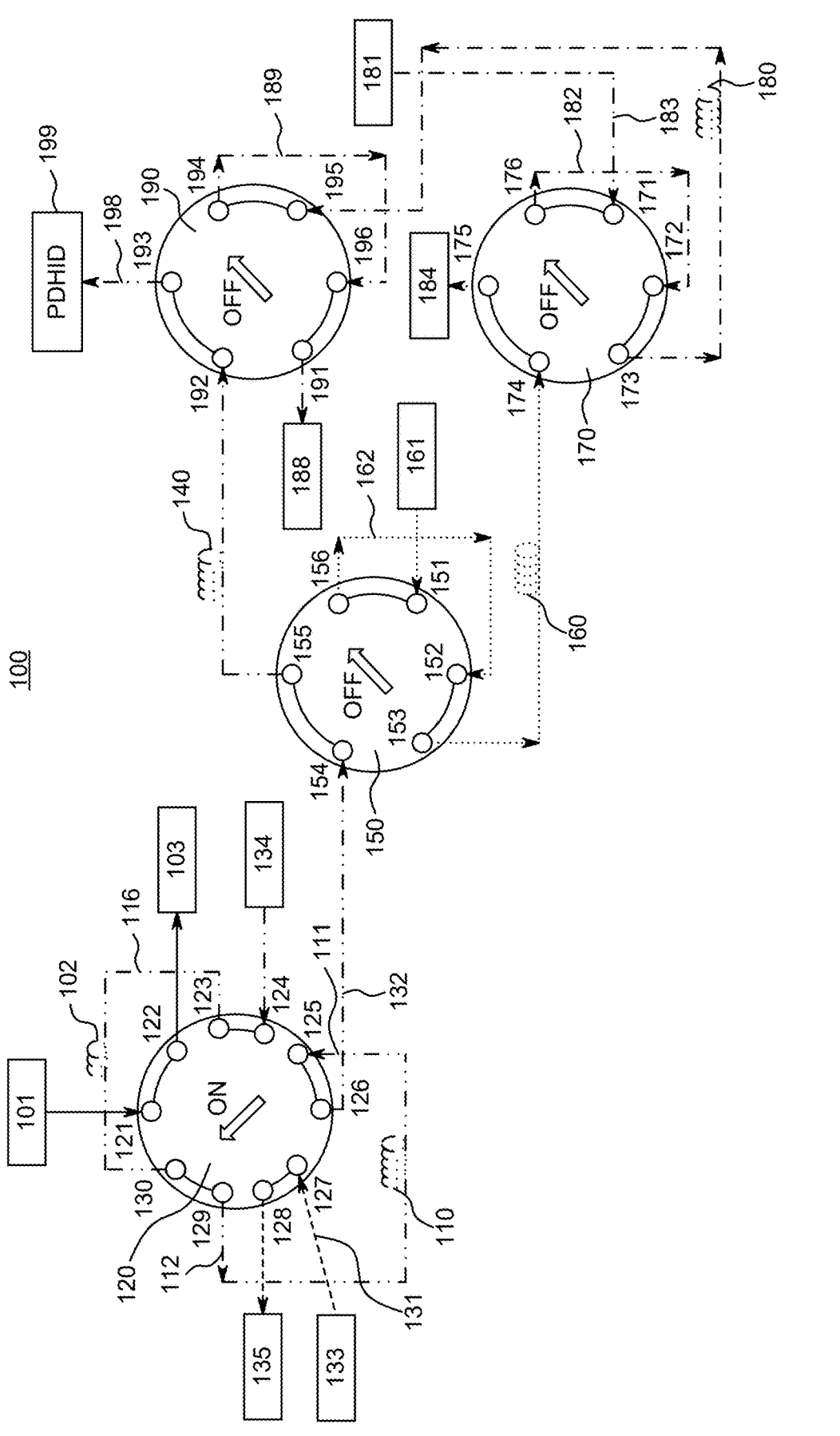

FIG. 1D illustrates operation at Step 4, when it is desired to pass $CO_2$ to the second column 140. After sending $H_2$, Air+CO, $CH_4$ into the third column 160, the first valve 120 remains ON, but the second valve 150 is switched to its OFF position, wherein the first column 110 and the second column 140 are fluidically connected. In the second column 140, $CO_2$ is further separated from the matrix residue ($H_2$) of the sample before passing to the fourth valve 190, to reduce or eliminate $H_2$ matrix effect. From the fourth valve 190, the $CO_2$ sample portion will be flowed to the detector 199 for detection.

A benefit of the GC system described here is using the second valve to send an analyte portion comprising one or more of Ar, $N_2$, $O_2$, CO and $CH_4$ to the third column without having those contaminants flow through the second column, and using the second valve to send the $CO_2$ portion to the second column without having the $CO_2$ flow through the third column. This improves peak shape (such as by reducing band broadening) by not requiring analytes to flow through columns that do not substantially contribute to the separation of those analytes. Additionally, by having the second valve switch the analytes to the appropriate separation columns, the present GC system can maintain continuous flow of the sample through the system rather than accumulating portions of the sample in an isolation valve. Eliminating such isolation valve also contributes to improved peak shape as compared to known GC systems.

Figure 1E:
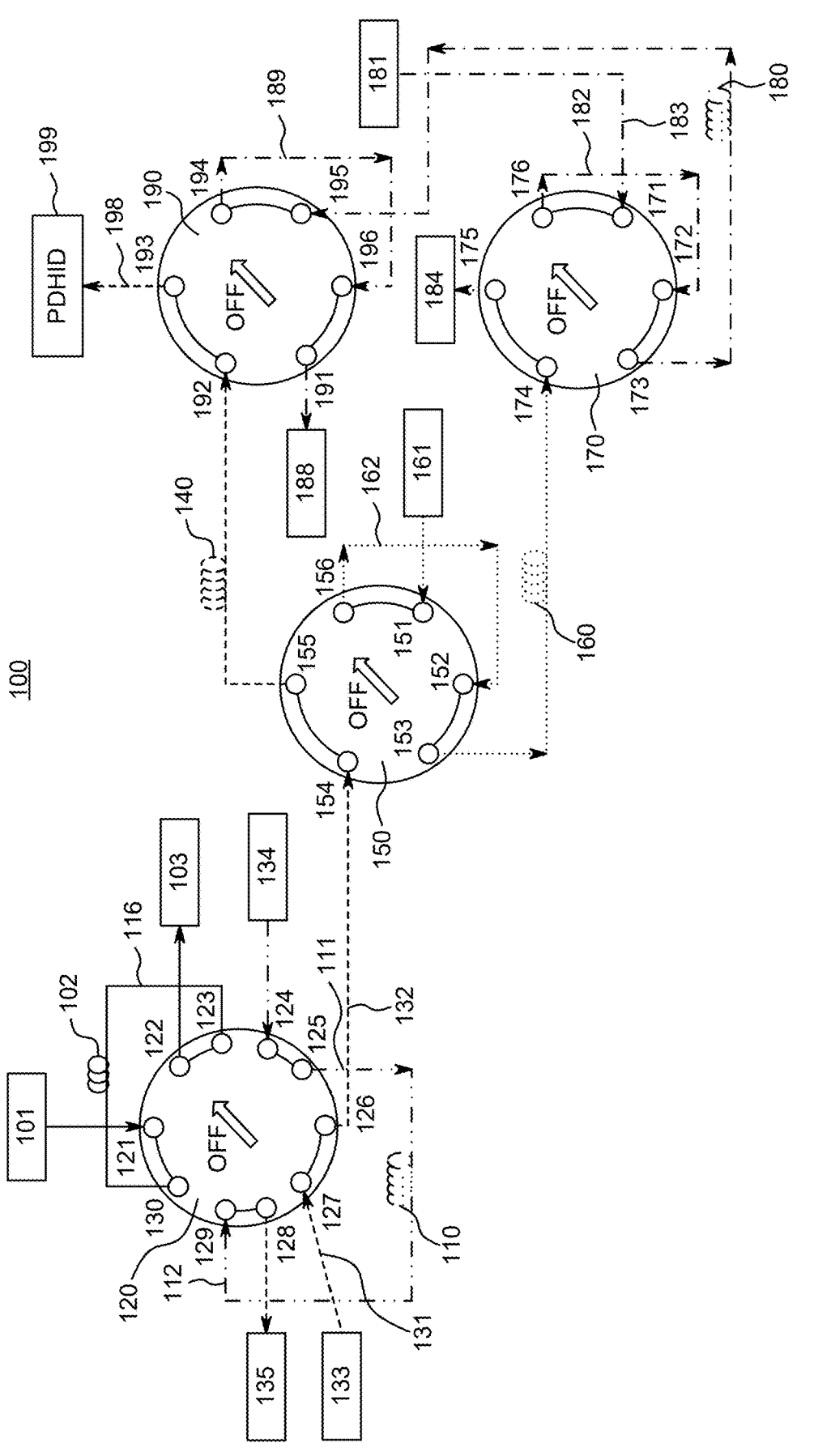

FIG. 1E illustrates operation at Step 5, if one desires to back flush heavy contaminants such as C2+ out of the first column 110. This improves system performance by reducing system contamination and reducing analysis time if there is no desire to quantitate or identify these analytes. The first valve 120 is switched to its OFF position, though even in this position, fluid is flowed through certain ports of the first valve 120. More particularly, in the OFF position, sample is not permitted to flow from the sample loop 102 to the first column 110, nor from the first valve 120 to the second valve 150. However, in the OFF position, first valve port 124 receives a carrier gas from carrier gas source 134 in order to backflush heavier contaminants such as C2+ from the first column 110 and out vent 135. Carrier gas from carrier gas source 133 flows into valve port 127, through conduit 132 and into valve port 154 of second valve 150 to continue moving analytes through column 140. The second valve 150 is switched to its OFF position, though even in this position, fluid is flowed through certain ports of the second valve 150. More particularly, in the OFF position, carrier gas flows into second valve inlet 151 from carrier gas source 161 and through second valve ports 156, 152, 153 to column 160. Components elute out from the third column 160 in the following order: $H_2$, Ar, $O_2$, $N_2$, $CH_4$, CO (though H2 matrix tails for a relatively long time, including over the elution times of the contaminants), and this column 160 also has the capability to separate Ar and O2. In system 100, third column 160 is fluidically connected to the third valve 170, which is in its OFF position, though it permits flow of the carrier gas and matrix ($H_2$ in this example) to third valve outlet 175 and out to a vent 184. In this manner, H2 matrix is purged out of the third column 160 and out of the system 100 via vent 184.

Figure 1F:
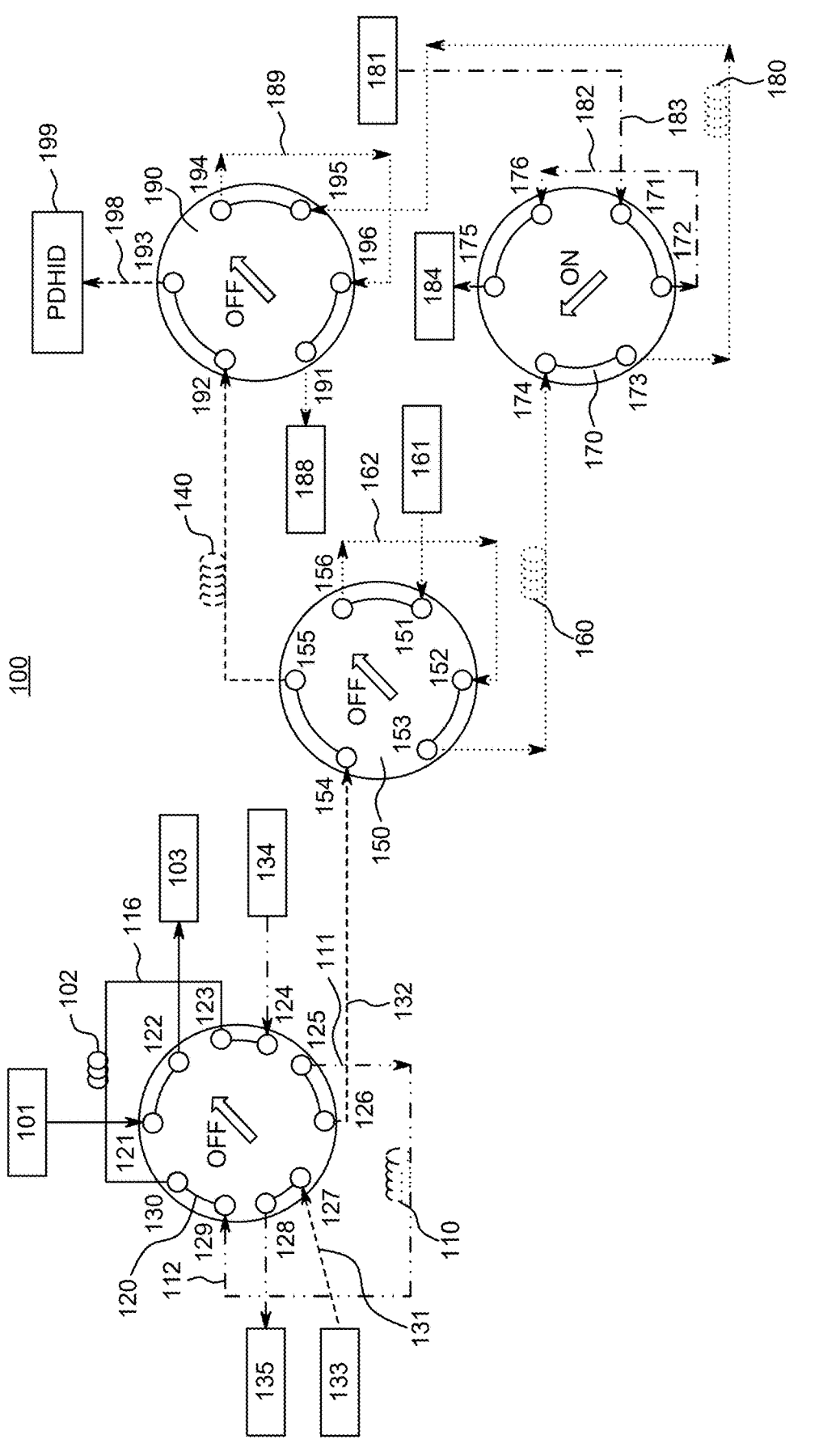

FIG. 1F illustrates operation at Step 6, if it is desired to flow Ar, $O_2$, $N_2$, $CH_4$, and CO to column 180. The first valve 120 and the second valve 150 are in their OFF positions. The third valve 170 is switched to its ON position after most H2 matrix has been purged out via vent 184 and before Ar is eluted from column 160. In its ON position, the third valve 170 permits sample to flow to the next separation column in the system, which is a fourth column 180. The third valve 170 provides a flowpath from a third valve inlet 174 to a third valve outlet 173, which is fluidically connected to a fourth column 180, so that sample portion containing Ar, $O_2$, $N_2$, $CH_4$, CO and possibly other analytes flows into column 180.

Figure 1G:
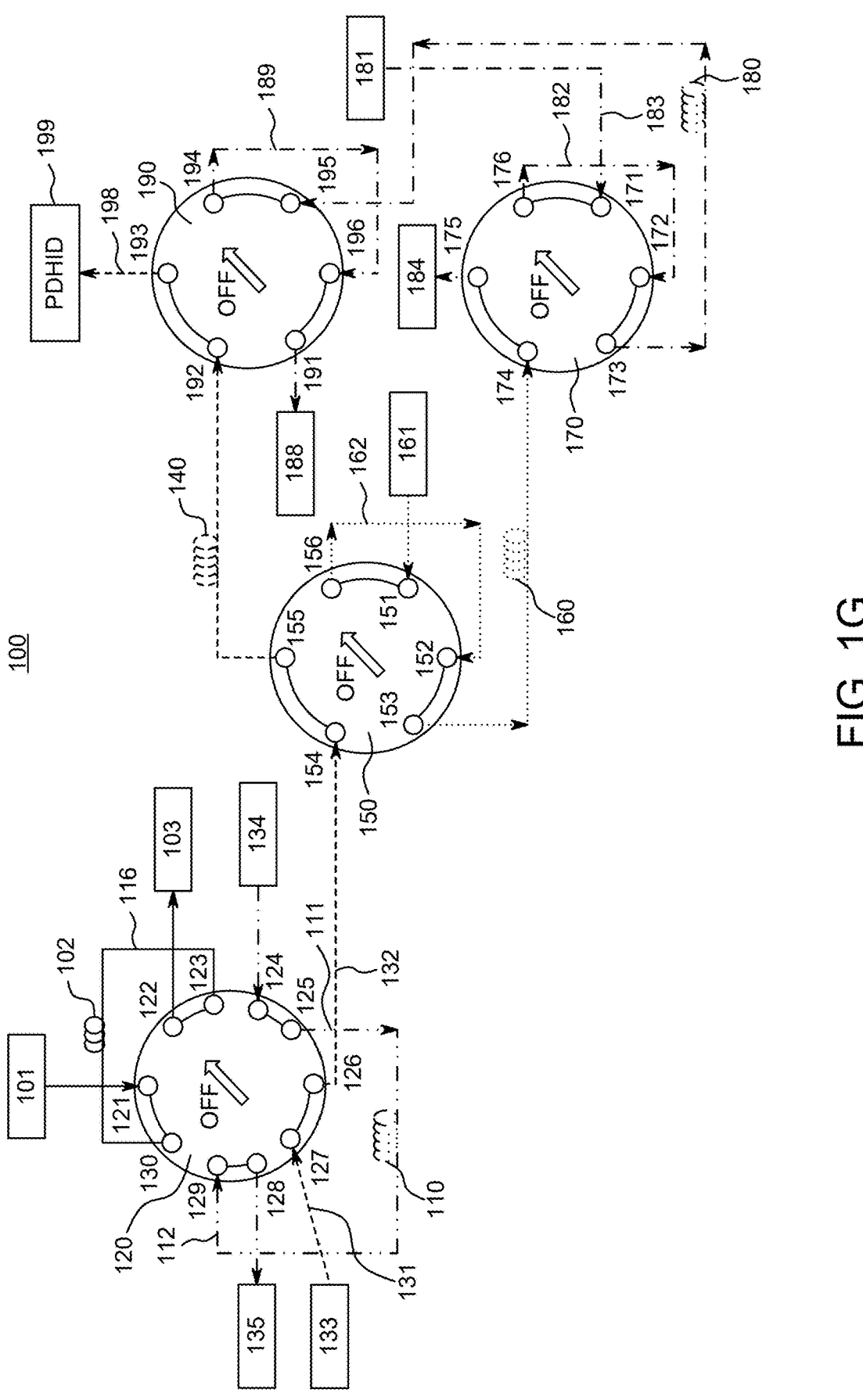

FIG. 1G illustrates operation at Step 7. All of the system's valves 120, 150, 170, 190 are in their OFF positions. During Step 7, only Ar and $O_2$ are sent into column 180 while H2 matrix residue is further purged out via Vent 184. In this manner, the amount of $H_2$ matrix being introduced to column 180 is reduced, without losing analytes $N_2$, $CH_4$ and CO. In system 100, the fourth valve 190 and various conduits provide a flowpath through ports 195, 194, 196 and 191 to Vent 188.

Figure 1H:
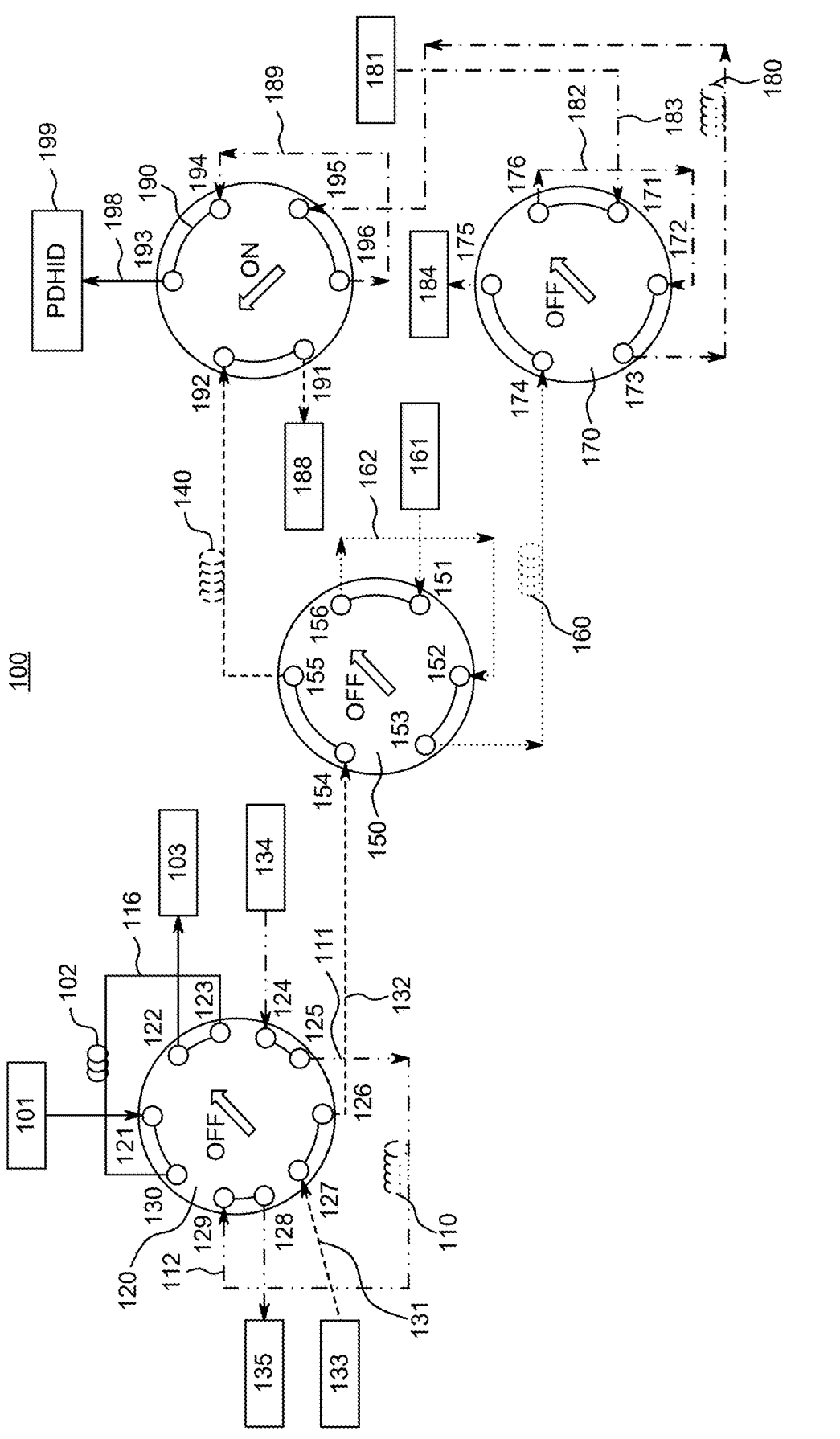

FIG. 1H illustrates operation at Step 8, after $CO_2$ is detected by detector 199 and one desires to pass the remaining analytes from column 180 to detector 199. The first, second and third valves 120, 150, 170 are in their OFF positions. The fourth valve 190 is switched to its ON position after $CO_2$ is detected by detector 199 (e.g. PDHID), so that column 180 is fluidically connected with detector 199 to send a reduced amount of $H_2$ matrix along with analytes Ar and $O_2$ for detection. In this state, carrier gas continues to backflush C2+ from column 110; and carrier gas continues to purge $H_2$ matrix from column 160 and out via port 175 and vent 184.

Figure 1I:
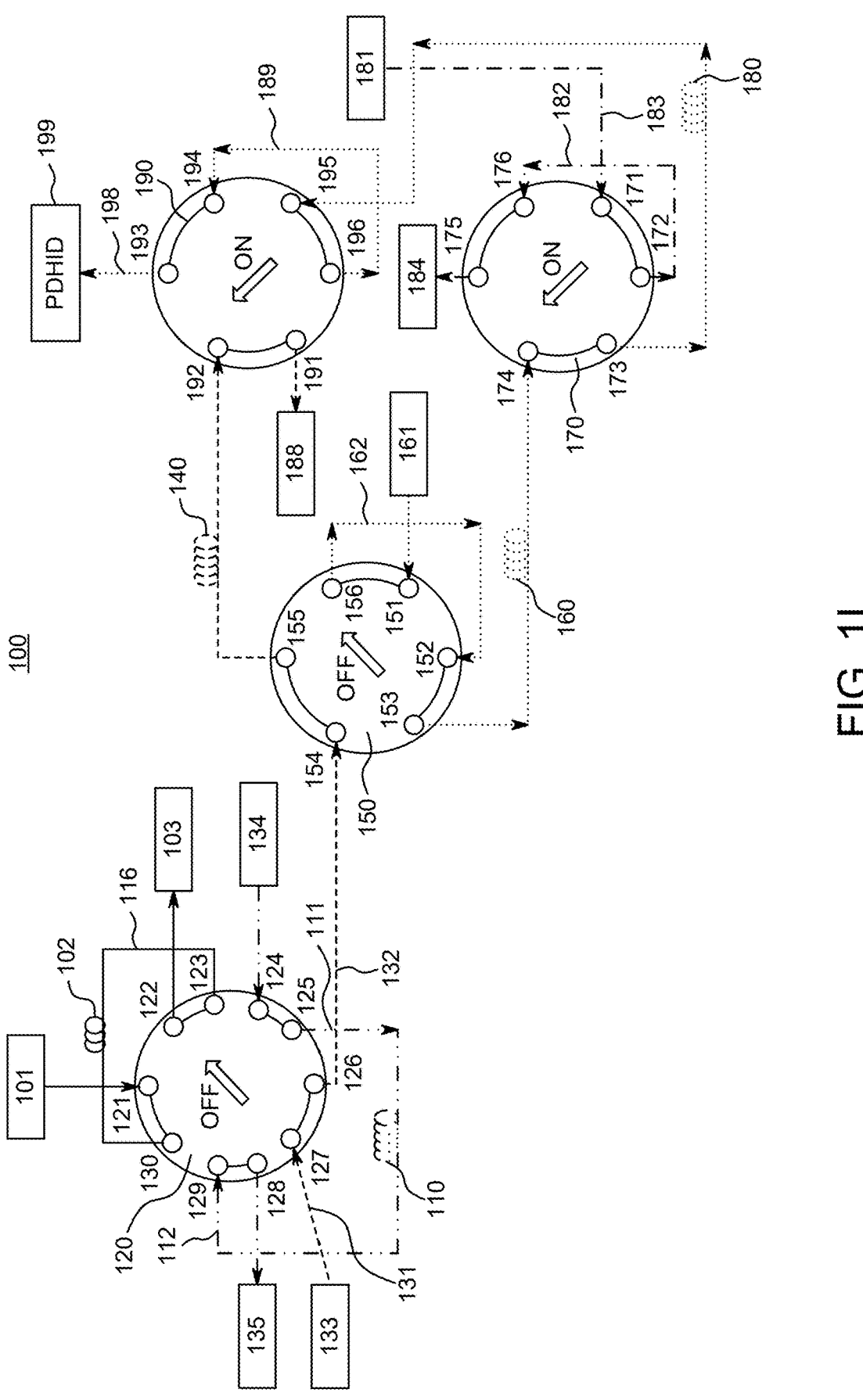

FIG. 1I illustrates operation at Step 9, when analytes such as $N_2$, $CH_4$ and CO flow from column 160 to column 180 and to detector 199. The first and second valves 120, 150 are in their OFF positions. The third and fourth valves 170, 190 are in their ON positions. In this state, column 160 is fluidically connected with column 180 to send $N_2$, $CH_4$, and CO to column 180, and column 180 is fluidically connected with detector 199 so that it detects Ar, $O_2$, $N_2$, $CH_4$ and CO.

Figure 1J:
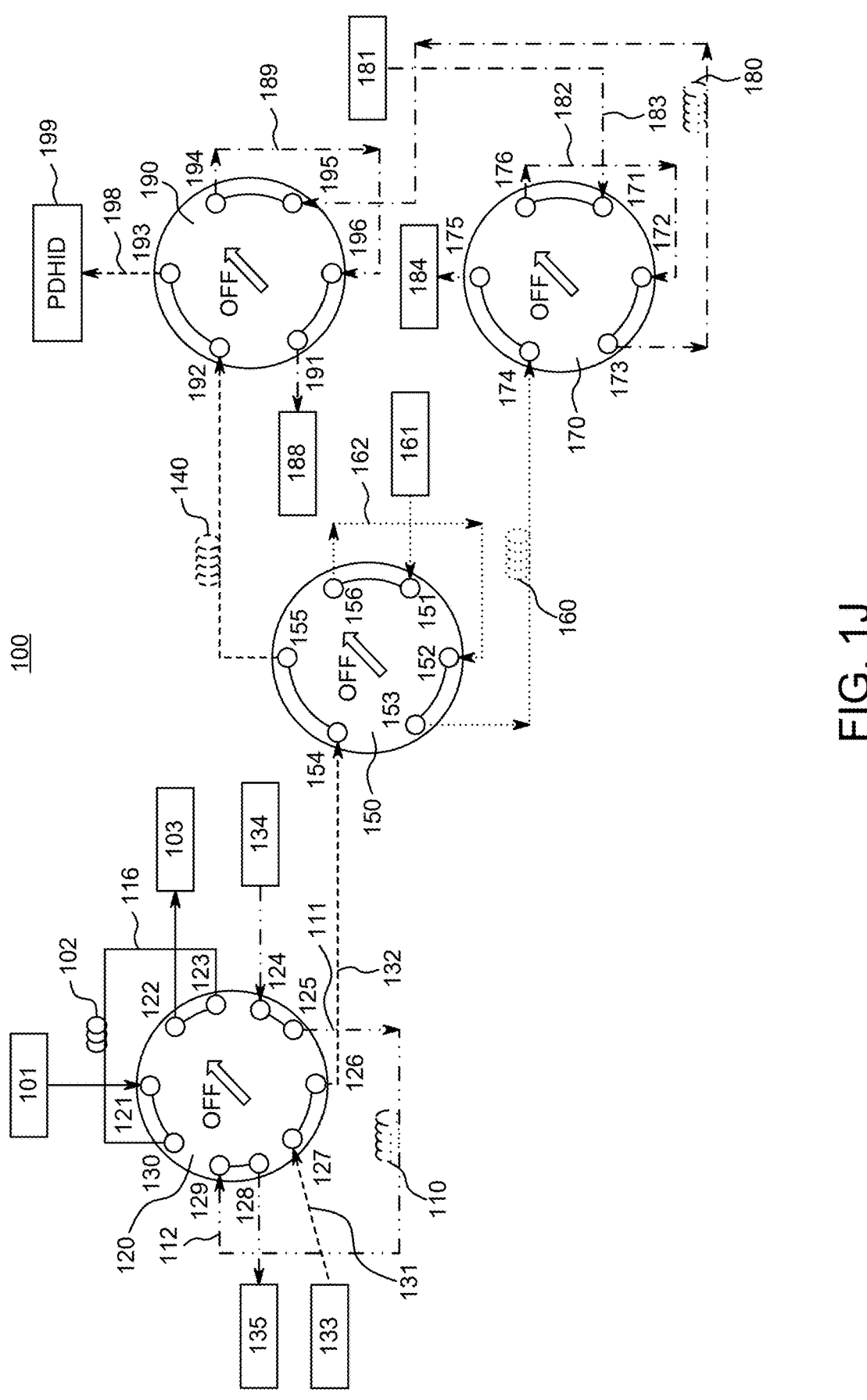

FIG. 1J illustrates operation at Step 10, after the sample analytes have been passed to the detector. The analysis of the analytes of the sample is complete, and the first, second, third, and fourth valves 120, 150, 170, 190 are in their OFF positions.

The foregoing description is not intended to limit connection of various elements to particular ports in all embodiments though in some embodiments, GC systems may comprise the particular connections as illustrated herein. In some embodiments, the first valve is a 10-port valve having ports 1 to 10 numbered clockwise (as illustrated by ports 121 to 130 in FIGS. 1A-1J) and the ports are connected to particular elements as follows: Port 1 is connected to a GC system entrance; Port 2 is connected to a sample outlet, Ports 3 and 10 are connected to loop ends of a sample loop; Ports 4 and 7 are connected to carrier gas sources; Ports 5 and 9 are connected to column ends of a first column; Port 6 is connected to a conduit to a second valve; and Port 8 is connected to a vent. In some embodiments, the second valve is a 6-port valve having ports 1 to 6 numbered clockwise (as illustrated by ports 151 to 156 in FIGS. 1A-1J) and the ports are connected to particular elements as follows: Port 1 is connected to a carrier gas supply; Port 2 and 6 are connected to ends of a conduit; Port 3 is connected to the entrance of an third column; Port 4 is connected to a conduit from the first valve; and Port 5 is connected to the entrance of a second column. In some embodiments, the third valve is a 6-port valve having ports 1 to 6 numbered clockwise (as illustrated by ports 171 to 176 in FIGS. 1A-1J) and the ports are connected to particular elements as follows: Port 1 is connected to a carrier gas source; Ports 2 and 6 are connected to ends of a conduit; Port 3 is connected to the entrance of a fourth column; Port 4 is connected to an outlet of the third column; and Port 5 is connected to a vent. In some embodiments, the fourth valve is a 6-port valve having ports 1 to 6 numbered clockwise (as illustrated by ports 191 to 196 in FIGS. 1A-1J) and the ports are connected to particular elements as follows: Port 1 is connected to a vent; Port 2 is connected to an outlet of the second column; Port 3 is connected to a GC system exit, which leads to a detector; Ports 4 and 6 are connected to a conduit; and Port 5 is connected to an outlet of the fourth column. The foregoing connections may be physical connections directly between the ports and other elements, and/or fluidic connections, wherein one or more other elements may be in the flowpath. With regard to the valves described in this paragraph as 6-port valves or 10-port valves, it is contemplated that those are the minimum number of ports for such valves, and they may comprise a higher number of ports if desired. Some embodiments of the present GC system comprise first, second, third and fourth valves having all of the connections to particular elements which have just been described. It should be understood that a commercially available valve may or may not have its ports marked in a permanent way, and one is free to number the ports as described herein, regardless whether such numbers matches the numbering marked in the valve so long as the order of connections set forth above is followed.

In some embodiments, the present systems include other features which may further improve them in various respects. For instance, carrier gas flow/and/or detector discharge flow can be controlled by electronic pneumatics control/pneumatics control modules (EPC/PCM) and can be purified by mini-getters so that the baseline is low and pneumatic control is precise. In some embodiments, the carrier gas may be helium. The GC system flowpath can be flushed using helium, preferably with a purity higher than 99.999%. The helium gas used as a carrier gas or as a flowpath purging gas can be distributed to EPCs or to the detector via a purifier such as a primary getter, and each gas conduit can come out of an EPC. In some embodiments, gas is purified by another purifier such as one or more smaller getters.

In some embodiments, the valves of the present systems are enclosed in a purging house. In some embodiments, the columns and/or fluidic conduits may also be enclosed in the purging house. The purging house may serve to provide an inert environment for the valves and reduce air incursion into the valves. This reduces flowpath contamination which could interfere with the analysis. The purging house may be sealed by a gasket on a plate, and a purging house cover can be fastened on the plate; however, other methods of constructing and/or sealing the purging house are also contemplated. Conduits such as stainless-steel tubing can be welded or otherwise attached in a manner that would create a gas-tight seal on the purging house where the gas can be supplied. A metering valve can be provided to control purging gas flow rate into the purging house. In some embodiments, the purging gas is Helium.

The valves of the present GC system generally have at least two valve positions. The valve positions of a given valve may be considered or referred to as ON and OFF with respect to overall fluid flow through the system, though not all ports of the valve are necessarily closed in the OFF position, and not all ports are necessarily open in the ON position. For instance, in one of the second valve's positions, the second valve inlet and the second column are fluidically connected, and in another of the second valve's positions, the valve inlet is fluidically connected to the third column. In some embodiments, the valves may be a 3-, 4-, 6- or 10-port diaphragm and/or rotary valves and should provide minimal dead volume for sample to become trapped.

In some embodiments, some or all of the first, second, third and fourth valves may be diaphragm valves. The use of diaphragm valves facilitates the enclosure of the GC system in a purging house which seals the GC system to reduce risk of contamination of the GC flowpath via air incursion into the valves. The valves can be actuated by high pressure gas through tubing attached to the purging house, thereby avoiding a need for motors in a purging house surrounding the valves or shafts that reach into a purging house. The connections between valves, conduits, EPCs/PCMs, and the detector should be gas tight. Connections between tubing and columns may utilize ferrules or other methods of connection with minimal dead-volume known in the art. Instead of attaching the columns directly to the valves, intermediary conduits may be attached to the valves that reach into the GC oven and attach to columns housed in the GC oven. By keeping the connections to one or more columns in the GC oven rather than in the purging house, maintenance time can be reduced when replacing or trimming a column as the purging house does not need to be vented in order to perform column maintenance.

A variety of GC separation columns are suitable for use in the present systems and methods. For example, Agilent J&W HP-PLOT Q is a bonded polystyrene-divinylbenzene (DVB) column with polarity between Porapak-Q and Porapak-N, and it is especially suitable for use as the first column and/or the second column. It is well suited for the separation of targeted nonpolar and polar compounds. In some embodiments, the column contains a stationary phase material which comprises a monomer, a prepolymer, a polymer, or a combination thereof. For example, the stationary phase material can comprise one or more polymers selected from the group consisting of polydimethylsiloxane (PDMS), polyphenylmethylsiloxane, poly(trifluoropropyldimethyl) siloxane, polycyanopropyl-phenyl siloxane, diethoxydimethylsilane (DEDMS), polyethylene glycol, and any combination thereof. For example, the first and second columns can be Porous Layer Open Tube (PLOT) columns with a polystyrene-divinylbenzene phase, and the third and fourth columns can be molecular sieve columns. As further examples, the first column can be an HP-PLOT-Q 30 m, 0.53 mm, 40u, with 2 PT; the second column can be an HP-PLOT-Q 15 m, 0.53 mm, 40u, with 2 PT; the third column can be a CP-Molsieve 5 A 50 m×0.53 mm×50 um with 2 PT; and the fourth column can be a CP-Molsieve 5 A 25 m×0.53 mm×50 um 5 in. Depending on the target analytes, there are several other columns which may be employed in molecular sieves in the present GC systems. For example, the first and second columns can be any columns that are capable of separating $CO_2$ from other components. The third and fourth columns can be other types of molecular sieves with different length and/or film thickness. The third and fourth columns can also be a sincarbon column. In some embodiments, a restriction is added to the second column, such as fused silica or metal tubing.

The GC system can further comprise one or more ovens in which one or more of the columns are located. In some embodiments, the GC system comprises one oven with multiple oven compartments which can be set to different temperatures or different temperature adjustment programs. The oven can be heated and/or cooled according to a desired temperature adjustment program. The oven may be a convection oven, conductive heating device, or other type of column heating apparatus. The oven may achieve temperatures ranging from ambient to 450° C. and may remain isothermal or be ramped in temperature during the analysis. The present GC system can also comprise a valve box in which one or more of the valves are located. The valve box may or may not be heated or include a heater or temperature controller.

In some embodiments, the GC systems described herein may be part of a gas analyzer system that also comprises a detector. The detector can have a detector entrance which is fluidically connected to the GC system exit. Detectors used in conjunction for gas chromatography for gas analysis are available in various technologies. Commonly used detectors include flame ionization detectors (FID), thermal conductivity detectors (TCD), flame photometric detectors (FPD), electron capture detectors (ECD), nitrogen-phosphorus detectors (NPD), alkali flame detectors (AFD), alkali flame ionization detectors (AFID), vacuum ultraviolet (VUV)

detectors. When mass spectrometers (MS) are as detectors, the gas analyzer system is typically referred to as a GC-MS system.

In some embodiments, the present gas analyzer system comprises a pulsed discharge ionization detector (PDID), such as a Pulsed Discharge Helium Ionization Detector (PDHID). A PDID generally includes a plasma discharge source, a detector entrance for analytes from a GC system, and an array of electrodes. Eluants from the GC column, flowing counter to the flow of helium from the discharge zone, are ionized by photons from the helium discharge. Bias electrode(s) focus the resulting electrons toward the collector electrode, where they cause changes in the standing current which are quantified as the detector signal. PDIDs can be operated in various modes, such as a pulsed discharge helium ionization detector (PDHID) mode, a pulsed discharge electron capture detector (PDECD) mode, and a pulsed discharge emission detector (PDED) mode. In the PDHID mode, the PDID employs a pulsed DC discharge in a gas to photoionize analytes eluting from the GC column, and electrons released from this photoionization process are directed to the electrode array. Changes in the measured current provide the detector signal.

In some embodiments, a vent comprising a flow restrictor is provided to control the flow rate of carrier gas, matrix and/or contaminants vented out of the GC system, such as vents 135, 184, 188, and/or sample outlet 103. This flow restrictor can be a needle valve, a piece of tubing with a specified inner diameter and length, or other devices capable of reducing the flow rate of a fluid. In some embodiments, the first valve, the third valve, and/or the fourth valve is connected to a vent comprising a variable restrictor. In some embodiments, the vents may have filters to trap contaminants being vented from the system.

The present apparatus (as illustrated by the embodiments described herein) can also comprise a controller, either as a part of the GC system, or as an external device in communication with it. The controller typically comprises a processor and memory. The controller is in electrical communication with, receives data from, and/or sends commands (directly or indirectly) to the first, second, third and fourth valves, the detector, flow control modules, heating apparatuses, and other devices that comprise the GC system. In some embodiments a controller is in electrical communication with, receives data from, and/or sends commands to an actuation system that switches the first, second, third and fourth valves.

Before being injected into the GC system, the sample may be housed in a pressurized gas cylinder, sample vial, or other gas-tight container. The sample may also be in the form of a gas stream. The sample container may be fluidically attached to the GC system entrance or the present GC systems can also include a sample injector configured to introduce a gas sample to the GC system entrance. In some embodiments, the sample injector is configured to introduce a high-purity gas sample such as high-purity hydrogen. The sample injector may or may not include a sample vaporizer.

The sample loop may be a conduit of known volume (e.g. tubing with a specified length and inner diameter) such that it can be filled with sample and allow a known and repeatable volume of sample to be injected into the GC system for analysis. Alternatively, in some embodiments, a trap could be used instead of a sample loop.

It is to be understood that the terminology used herein is for purposes of describing particular embodiments only and is not intended to be limiting. The defined terms are in addition to the technical and scientific meanings of the defined terms as commonly understood and accepted in the technical field of the present teachings.

The term "valve" generally encompasses any structure that can be adjusted (such as by switching or turning on or off) to change a flowpath into, out of, and/or through the structure. Generally, a valve is substantially fluid-tight so as to prevent loss of fluid from the flowpath. An example of a suitable valve (e.g., the first, second, third, or fourth valve) is a rotary valve, such as a rotary valve comprising a stator and a rotor. A rotary valve comprises a stator and a rotor, wherein one or both of the stator and the rotor are rotable to different rotary valve positions. The stator and the rotor have surfaces adjacent to each other, and one or both is configured to rotate with respect to the other. The valve inlets and outlet(s) in this embodiment are passages or through-holes in the stator. The rotor comprises a switchable fluid path, which may be a groove in the rotor surface. By rotating the stator and/or the rotor, the fluid path connects a different valve inlet with the valve outlet. Other examples of suitable valves are diaphragm valves. Typical valve materials include metal materials which may or may not be inert. The valve desirably has low dead-volume so as to leave a low flush time and not trap sample.

The term "conduit" generally encompasses any structure configured to define a flowpath for fluid to travel from one point (e.g., an inlet of the conduit) to another point (e.g., an outlet of the conduit), though a conduit can deliver fluid to intermediate points as well. A conduit can be flexible, rigid, or both in some measure or portions. A conduit can be relatively long or short, and/or linear or nonlinear, so long as it provides a flowpath from one component (such as a gas source) to another component (such as a vent). For example, a conduit can be a long tube, a short fitting, or a manifold with multiple entrances and/or exits. A conduit typically has an entrance and an exit, though in some embodiments, a conduit can have multiple entrances and/or exits, such as where a conduit with two or more entrances converges or joins to one exit, or where a conduit with one entrance diverges or splits to two or more exits. A conduit is often described by its length and inner diameter (i.d.) which can be used to calculate a volume of a conduit. For instance, an exemplary conduit has a length between 10 cm and 50 cm and an inner diameter of 0.02 inch; such a conduit would have a volume of 0.02 to 0.10 mL. Of course conduits of other lengths, inner diameters, and volumes are also contemplated. The geometry of a conduit may vary widely and includes circular, rectangular, square, D-shaped, trapezoidal or other polygonal cross-sections. A conduit may comprise varying geometries (e.g., rectangular cross-section at one section and trapezoidal cross-section at another section). For conduits in the sample flowpath, stainless steel or other metal tubing is often preferred to avoid contamination, but other materials may be used, such as plastics, fused silica, and other metals. The conduits and valves may optionally be coated with a material to improve inertness, such as a deactivation coating.

The term "connected" means that two components are fluidically connected, or physically connected, or both. The term "fluidically connected" means that two components are in fluid communication and includes direct connections between the two components as well as indirect connections where one or more other components are in the flowpath between the two components. For example, a first component and a second component are fluidically connected if an outlet from the first component is physically connected to an inlet of the second component, or if a conduit connects the first and second components, or if one or more intervening components, such as a valve, a pump, or other structure, is between the two components as fluid flows from the first component to the second component, or vice versa. Components can be physically connected in any suitable way, such as by using ferrules, brazing, and other approaches. In general, physical connections that are fluid-tight and/or that minimize dead-volume are desired for the present apparatus.

In the present disclosure, the terms "substantial" or "substantially" mean to within acceptable limits or degree to one having ordinary skill in the art. The terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same. When a ranges of values is set forth in the present disclosure, it should be understood that both the exact value is disclosed as well as approximate values. It should also be understood that any lower and higher values can be combined to form a range.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described. All patents and publications referred to herein are expressly incorporated by reference.

As used in the specification and appended claims, the terms "a," "an," and "the" include both singular and plural referents, unless the context clearly dictates otherwise. Thus, for example, "a conduit" includes one conduit and plural conduits. Unless otherwise indicated, the terms "first", "second", "third", and other ordinal numbers are used herein to distinguish different elements of the present devices and methods, and are not intended to supply a numerical limit. Reference to first and second valve positions should not be interpreted to mean that the device only has two valve positions. An apparatus having first and second elements can also include a third, a fourth, a fifth, and so on, unless otherwise indicated.

Example 1

In this example, a high-purity H2 gas was analyzed for contaminants using the present GC system. A sample comprising contaminants in a H2 matrix was introduced to the GC system of FIGS. 1A to 1J and operated as generally described above in connection with those figures, wherein Steps 1 to 10 were performed at the following time points:

| Step | Time |
|------|------|
| 1 | 0 min |
| 2 | 0.01 min |
| 3 | 1.5 min |
| 4 | 1.8 min |
| 5 | 2.1 min |
| 6 | 5.5 min |
| 7 | 6 min |
| 8 | 6.5 min |
| 9 | 7 min |
| 10 | 16 min |

The initial flow rate in each of columns 110, 140, 160 and 180 is 10 ml/min, alternatively in a range of from 5 to 15 ml/min. The oven temperature is 50° C., hold for 2 min, 20° C./min to 110° C., hold for 11 min. For the detector 199, in this case a Pulsed Discharge Helium Ionization Detector (PDHID), helium gas is flowed at 31 ml/min, 120° C. The example oven program is: Oven initial temperature is 50° C., holding for 2 min, then ramping the temperature at a rate of 20° C./min to 110° C., holding for 11 min, for a total of 16 min.

Figure 2:
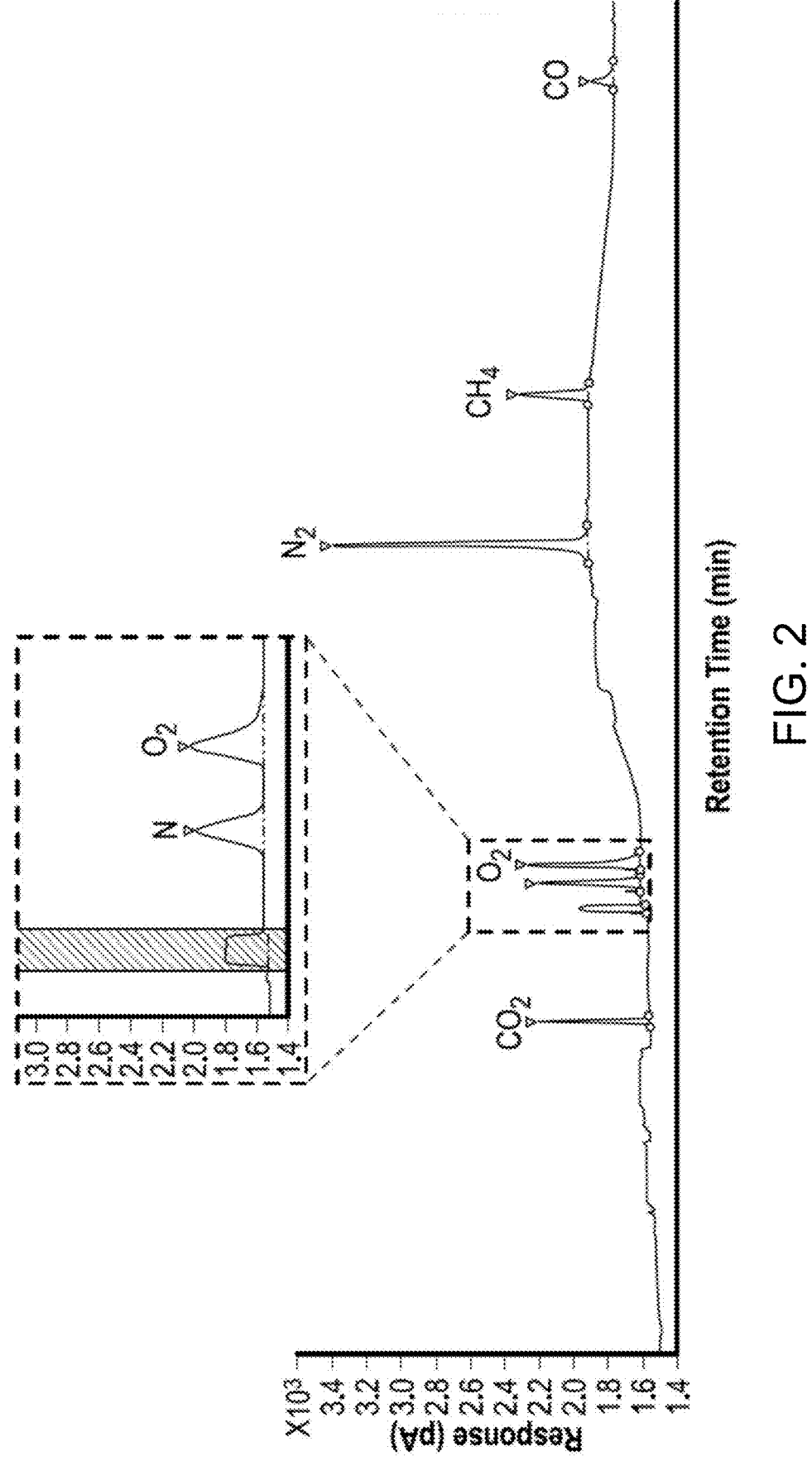
FIG. 2 shows results from operation of an embodiment of the present gas chromatography system.

FIG. 2 shows the analytes (contaminants) detected in the sample of the high-purity $H_2$ gas. The GC system provided $CO_2$ to the detector before the other analytes, and it separated each of CO, $CH_4$, $N_2$, Ar, and $O_2$ from a significant amount of unpurged $H_2$. Ar and $O_2$ were separated and detected apart from unpurged H2 matrix.

Exemplary Embodiments

Exemplary embodiments provided in accordance with the presently disclosed subject matter include, but are not limited to, the following:

Embodiment 1. A gas chromatography (GC) system for separating analytes from a matrix, the GC system comprising: a GC system entrance; a first column fluidically connected to the GC system entrance through a first valve, wherein the first column is capable of separating one or more of Ar, $O_2$, $N_2$, $CH_4$, and CO from a gas matrix and from $CO_2$; a second column fluidically connected to the first column through a second valve, wherein the second column is capable of separating CO2 from the gas matrix; a third column fluidically connected to the first column through the second valve, wherein the third column is capable of separating one or more analytes selected from the group consisting of Ar, $O_2$, $N_2$, $CH_4$, and CO from the gas matrix and from another analyte of said one or more analytes; a fourth column fluidically connected to the third column through a third valve, wherein the fourth column is capable of further separating one or more of Ar, $O_2$, $N_2$, $CH_4$, and CO from the gas matrix; and a GC system exit fluidically connected to both the fourth column and the second column through a fourth valve. The first valve comprises 10 or more ports and has two or more positions, and in one position, the first valve provides a flowpath between a sample inlet and a sample loop, and in another position, the first valve provides a flowpath between the sample loop and the first column. The second valve is a multi-port valve having two or more positions, and in one position, the second valve makes a fluidic connection between the first column and the second column, and in another position, the second valve makes a fluidic connection between the first column and the third column. The third valve is a multi-port valve having two or more positions, where in one position, the third valve makes a fluidic connection between the third column and the fourth column, and in another position, the third valve makes a fluidic connection between the third column and a vent. The fourth valve is a multi-port valve having two or more positions, and in one position, the third valve makes a fluidic connection between the second column and the GC system exit, and in another position, it makes a fluid connection between the fourth column and the GC system exit.

Embodiment 2. The GC system of embodiment 1, wherein each of the second, third, and fourth valves comprises 6 or more ports.

Embodiment 3. The GC system of embodiment 1 or 2, wherein one or both of the first column and the fourth column are Porous Layer Open Tube (PLOT) columns with a polystyrene-divinylbenzene phase.

Embodiment 4. The GC system of any of embodiments 1 to 3, wherein one or both of the second column and the third column are molecular sieve columns.

Embodiment 5. The GC system of embodiment 1, wherein the first column has two ends, one of said first valve ports is fluidically connected to the GC system entrance, and two of said first valve ports are fluidically connected to ends of the first column; where, in one position, the first valve makes a fluidic connection between the first column and the second valve and, in another position, the first valve makes a fluid connection between the first column and a vent.

Embodiment 6. The GC system of any of the foregoing embodiments, further comprising a conduit directly connecting the first valve to the second valve.

Embodiment 7. The GC system of any of the foregoing embodiments, further comprising one or more of: a conduit whose inlet and outlet are attached to separate ports of the second valve; a conduit whose inlet and outlet are attached to separate ports of the third valve; a conduit whose inlet and outlet are attached to separate ports of the fourth valve.

Embodiment 8. The GC system of any of the foregoing embodiments, wherein the first valve and/or the third valve and/or the fourth valve is connected to a vent comprising a variable or fixed restrictor.

Embodiment 9. The GC system of any of the foregoing embodiments, wherein each of the first, second, third, and fourth valves is a diaphragm valve.

Embodiment 10. The GC system of any of the foregoing embodiments, wherein the first column, the second column, the third column, and the fourth column are enclosed in an oven.

Embodiment 11. The GC system of any of the foregoing embodiments, wherein the valves are enclosed in a purging house.

Embodiment 12. The GC system of any of the foregoing embodiments, further comprising: one or more carrier gas sources fluidically connected to two or more ports of the first valve.

Embodiment 13. The GC system of any of the foregoing embodiments, further comprising a carrier gas source fluidically connected to the second valve, and a carrier gas source fluidically connected to the third valve, wherein the carrier gas source is the same or different for the first, second and third valves.

Embodiment 14. The GC system of embodiment 13, further comprising one or more getters between the carrier gas sources and the first, second, or third valves so as to purify carrier gas.

Embodiment 15. The GC system of any of the foregoing embodiments, further comprising a controller in signal communication with each of the first, second, third and fourth valves.

Embodiment 16. A gas analyzer system comprising: the gas chromatography system of any of the foregoing embodiments, and a detector having a detector entrance. The GC system exit is fluidically connected to the detector entrance.

Embodiment 17. The system of embodiment 16, wherein the detector is a Pulsed Discharge Helium Ionization Detector (PDHID).

Embodiment 18. A method of operating the GC system of any of the foregoing embodiments, the method comprising: flowing a gas sample into a first valve inlet of the first valve, with the first valve in a position to fluidically connect the first valve inlet to a sample loop; switching the first valve to fluidically connect the sample loop and the first column; separating the gas sample into a matrix portion, an analyte portion, and a $CO_2$ portion in the first column, wherein the analyte portion comprises one or more of Ar, $O_2$, $N_2$, $CH_4$ and CO.

Embodiment 19. The method of embodiment 18, further comprising positioning the second valve to make a fluidic connection between the first column and the third column and flowing the analyte portion to the third column.

Embodiment 20. The method of embodiment 18 or 19, further comprising positioning the third valve to make a fluidic connection between the third column and the fourth column and flowing the analyte portion to the fourth column.

Embodiment 21. The method of any of embodiments 18 to 20, further comprising positioning the third valve to make a fluidic connection between the third column and a vent, and venting gas matrix eluting from the third column out of the vent.

Embodiment 22. The method of any of embodiments 18 to 21, further comprising positioning the fourth valve to make a fluidic connection between the fourth column and a vent and venting gas matrix eluting from the fourth column out of the vent.

Embodiment 23. The method of any of embodiments 18 to 22, further comprising positioning the fourth valve to make a fluidic connection between the fourth column and the GC system exit and flow the analyte portion to the GC system exit.

Embodiment 24. The method of any of embodiments 18 to 23, further comprising switching the second valve to make a fluidic connection between the first column and the second column and flow the $CO_2$ portion to the second column.

Embodiment 25. The method of embodiment 24, further comprising positioning the fourth valve to make a fluidic connection between the second column and the GC system exit and flowing the $CO_2$ portion to the GC system exit.

Embodiment 26. The method of any of embodiments 18 to 25, comprising passing $CO_2$ to the second column and to the GC system exit without passing through an isolation valve.

Embodiment 27. The method of any of embodiments 18 to 26, wherein one or more of Ar, $N_2$, $O_2$, $CH_4$ and CO bypass the second column and pass to the third column and the fourth column.

Embodiment 28. The method of any of embodiments 18 to 27, wherein the first valve is configured to make a fluidic connection between the first column and a vent such that heavier alkanes are back-flushed from the first column and vented, without passing to the second column.

Embodiment 29. A method of analyzing a high-purity hydrogen gas for contaminants, the method comprising: flowing a sample of the hydrogen gas into the GC system entrance of the GC system of any of embodiments 1 to 17; and venting at least a portion of the hydrogen from the sample before passing the sample to the detector.

Embodiment 30. The method of embodiment 29, further comprising: passing the sample through the first column and eluting hydrogen, contaminant, and $CO_2$ portions of the sample, where the hydrogen and contaminant portions elute before a $CO_2$ portion of the sample; and passing the contaminant portion of the sample to the third column.

Embodiment 31. The method of embodiment 29 or embodiment 30, wherein the $CO_2$ portion flows to a detector without passing through an isolation valve.

Embodiment 32. The method of any of embodiments 29 to 31, wherein the $CO_2$ portion of the sample is analyzed by the detector before the contaminant portion of the sample.

The foregoing description of exemplary or preferred embodiments should be taken as illustrating, rather than as limiting the present invention as defined by the embodiments. As will be readily appreciated, numerous variations and combinations of the features set forth above can be utilized without departing from the present invention as set forth in the embodiments. Such variations are not regarded as a departure from the scope of the invention, and all such variations are intended to be included within the scope of the following embodiments. All references cited herein are incorporated by reference in their entireties.

We claim:

1. A gas chromatography (GC) system for separating analytes from a matrix, the GC system comprising:
   a GC system entrance;
   a first column fluidically connected to the GC system entrance through a first valve, wherein the first column is capable of separating one or more of Ar, $O_2$, $N_2$, $CH_4$, and CO from a gas matrix and from $CO_2$;
   a second column fluidically connected to the first column through a second valve, wherein the second column is capable of separating $CO_2$ from the gas matrix;
   a third column fluidically connected to the first column through the second valve, wherein the third column is capable of separating one or more analytes selected from the group consisting of Ar, $O_2$, $N_2$, $CH_4$, and CO from the gas matrix and from another analyte of said one or more analytes;
   a fourth column fluidically connected to the third column through a third valve, wherein the fourth column is capable of further separating one or more of Ar, $O_2$, $N_2$, $CH_4$, and CO from the gas matrix; and
   a GC system exit fluidically connected to both the fourth column and the second column through a fourth valve;
   wherein the first valve comprises 10 or more ports and has two or more positions, and in one position, the first valve provides a flowpath between a sample inlet and a sample loop, and in another position, the first valve provides a flowpath between the sample loop and the first column;
   wherein the second valve is a multi-port valve having two or more positions, and in one position, the second valve makes a fluidic connection between the first column and the second column, and in another position, the second valve makes a fluidic connection between the first column and the third column;
   wherein the third valve is a multi-port valve having two or more positions, where in one position, the third valve makes a fluidic connection between the third column and the fourth column, and in another position, the third valve makes a fluidic connection between the third column and a vent;
   wherein the fourth valve is a multi-port valve having two or more positions, and in one position, the fourth valve makes a fluidic connection between the second column and the GC system exit, and in another position, the fourth valve makes a fluid connection between the fourth column and the GC system exit.

2. The GC system of claim 1, wherein each of the second, third, and fourth valves comprises 6 or more ports.

3. The GC system of claim 1, wherein one or both of the first column and the fourth column are Porous Layer Open Tube (PLOT) columns with a polystyrene-divinylbenzene phase.

4. The GC system of claim 1, wherein one or both of the second column and the third column are molecular sieve columns.

5. The GC system of claim 1, wherein the first column has two ends, one of said first valve ports is fluidically connected to the GC system entrance, and two of said first valve ports are fluidically connected to ends of the first column;
   where, in one position, the first valve makes a fluidic connection between the first column and the second valve and, in another position, the first valve makes a fluid connection between the first column and a vent.

6. The GC system of claim 1, further comprising a conduit directly connecting the first valve to the second valve.

7. The GC system of claim 1, further comprising one or more of:
   a conduit whose inlet and outlet are attached to separate ports of the second valve;
   a conduit whose inlet and outlet are attached to separate ports of the third valve; and
   a conduit whose inlet and outlet are attached to separate ports of the fourth valve.

8. The GC system of claim 1, wherein the first valve and/or the third valve and/or the fourth valve is connected to a vent comprising a variable or fixed restrictor.

9. The GC system of claim 1, wherein each of the first, second, third, and fourth valves is a diaphragm valve.

10. The GC system of claim 1, wherein the first column, the second column, the third column, and the fourth column are enclosed in an oven.

11. The GC system of claim 1, wherein the valves are enclosed in a purging house.

12. The GC system of claim 1, further comprising:
   one or more carrier gas sources fluidically connected to two or more ports of the first valve.

13. The GC system of claim 1, further comprising a carrier gas source fluidically connected to the second valve, and a carrier gas source fluidically connected to the third valve, wherein the carrier gas source is the same or different for the first, second and third valves.

14. The GC system of claim 13, further comprising one or more getters between the carrier gas sources and the first, second, or third valves so as to purify carrier gas.

15. The GC system of claim 1, further comprising a controller in signal communication with each of the first, second, third and fourth valves.

16. A gas analyzer system comprising:
   the gas chromatography system of claim 1, and
   a detector having a detector entrance,
   wherein the GC system exit is fluidically connected to the detector entrance.

17. The system of claim 16, wherein the detector is a Pulsed Discharge Helium Ionization Detector (PDHID).

18. A method of operating the GC system of claim 1, the method comprising:
   flowing a gas sample into a first valve inlet of the first valve, with the first valve in a position to fluidically connect the first valve inlet to a sample loop;
   switching the first valve to fluidically connect the sample loop and the first column;
   separating the gas sample into a matrix portion, an analyte portion, and a $CO_2$ portion in the first column, wherein the analyte portion comprises one or more of Ar, $O_2$, $N_2$, $CH_4$ and CO.

19. The method of claim 18, further comprising positioning the second valve to make a fluidic connection between the first column and the third column and flowing the analyte portion to the third column.

20. The method of claim 18, further comprising positioning the third valve to make a fluidic connection between the third column and the fourth column and flowing the analyte portion to the fourth column.

21. The method of claim 18, further comprising positioning the third valve to make a fluidic connection between the third column and a vent, and venting gas matrix eluting from the third column out of the vent.

22. The method of claim 18, further comprising positioning the fourth valve to make a fluidic connection between the fourth column and a vent and venting gas matrix eluting from the fourth column out of the vent.

23. The method of claim 18, further comprising positioning the fourth valve to make a fluidic connection between the fourth column and the GC system exit and flow the analyte portion to the GC system exit.

24. The method of claim 18, further comprising switching the second valve to make a fluidic connection between the first column and the second column and flow the $CO_2$ portion to the second column.

25. The method of claim 24, further comprising positioning the fourth valve to make a fluidic connection between the second column and the GC system exit and flowing the $CO_2$ portion to the GC system exit.

26. The method of claim 18, comprising passing $CO_2$ to the second column and to the GC system exit without passing through an isolation valve.

27. The method of claim 18, wherein one or more of Ar, $N_2$, $O_2$, $CH_4$ and CO bypass the second column and pass to the third column and the fourth column.

28. The method of claim 18, wherein the first valve is configured to make a fluidic connection between the first column and a vent such that heavier alkanes are back-flushed from the first column and vented, without passing to the second column.

29. A method of analyzing a high-purity hydrogen gas for contaminants, the method comprising:

flowing a sample of the hydrogen gas into the GC system entrance of the GC system of claim 1; and venting at least a portion of the hydrogen from the sample before passing the sample to the detector.

30. The method of claim 29, further comprising:

passing the sample through the first column and eluting hydrogen, contaminant, and $CO_2$ portions of the sample, where the hydrogen and contaminant portions elute before a $CO_2$ portion of the sample; and passing the contaminant portion of the sample to the third column.

31. The method of claim 29, wherein the $CO_2$ portion flows to a detector without passing through an isolation valve.

32. The method of claim 29, wherein the $CO_2$ portion of the sample is analyzed by the detector before the contaminant portion of the sample.

* * * * *